Figure 1:
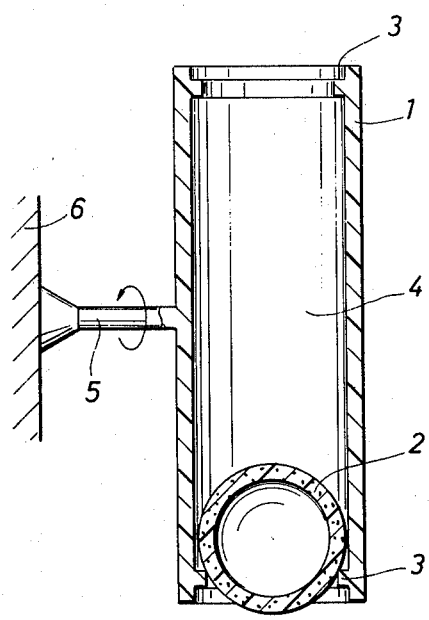

United States Patent [19]

Van Breen et al.

[11] 4,149,675

[45] Apr. 17, 1979

[54] VAPOR EMITTER

[75] Inventors: Adriaan W. Van Breen; Eugéne Nicolai, both of Amsterdam, Netherlands

[73] Assignee: Shell Oil Company, Houston, Tex.

[21] Appl. No.: 818,707

[22] Filed: Jul. 25, 1977

[30] Foreign Application Priority Data

Jul. 26, 1976 [GB] United Kingdom ............... 31048/76

[51] Int. Cl.$^2$ ............................................. A24F 25/00
[52] U.S. Cl. ...................................... 239/54; 239/55; 239/57
[58] Field of Search ................................... 239/53–60; 261/81, 83

[56] References Cited

U.S. PATENT DOCUMENTS

| 711,923 | 10/1902 | Fales | 239/57 X |
|---|---|---|---|
| 965,392 | 7/1910 | Meeker | 239/55 |
| 2,578,827 | 12/1951 | Munnecke | 239/59 X |
| 3,790,081 | 2/1974 | Thornton et al. | 239/55 |

*Primary Examiner*—John J. Love

[57] ABSTRACT

A vapor-emitter capable of continuously and slowly emitting vapors, and repeatedly and rapidly expelling a boost of vapors, into the atmosphere surrounding the container, comprising a container having at least one slow release generator positioned therein, characterized in that the container is provided with at least one opening at two different locations, the slow release generator being part of or forming a substantially vapor-tight partition between the locations and being in contact with the atmosphere on both sides of the partition, and expelling means being provided for expelling vapor-containing air from the container.

6 Claims, 3 Drawing Figures

VAPOR EMITTER

The invention relates to a vapour-emitter.

It is known to incorporate a volatile compound, i.e. a compound which is volatile at ambient temperature, such as an odorant or a pesticide, in a solid carrier. Exposure of the resulting composition to the atmosphere results in the slow emission of vapours of the volatile compound from the surface of the composition into the atmosphere. It is also known that such compositions may be moulded, extruded or otherwise formed into articles such as strips, rods etc. Such articles are referred to herein as slow release generators.

It is further known, e.g. from British patent application No. 7774/74, that such slow release generators may be positioned within container to form articles which are referred to herein as vapour-emitters. Such vapour-emitters include air-fresheners, pesticides etc. The vapour-emitter may be in the form of a closable container. Such closable containers, when open, slowly release vapours into the atmosphere surrounding the holder and, when closed, slowly release vapours into the space or reservoir within the holder, and which subsequently slowly diffuse into the atmosphere surrounding the container when the closed holder is opened.

There are situations when it would be highly desirable if such vapour-emitters could be capable of repeatedly and rapidly expelling a boost of vapours into the atmosphere over and above those vapours which are being continuously and slowly emitted from the slow release generator. This would be desirable if the vapour-emitter was an air-freshener and was located in a room where the production of obnoxious odours is periodic. This is not possible using known vapour-emitters. It is possible to provide periodic boosts of vapours into the atmosphere if use is made of a pressurized container of volatile compound but such containers are not capable of providing a continuous and slow emission of vapours whilst they are not being activated.

It would therefore be desirable if a vapour-emitter could be found which combines the feature of known slow release vapour-emitters in that it is capable of continuously and slowly emitting vapours into the surrounding atmosphere and the feature of pressurized containers in that it is also capable of repeatedly and rapidly expelling a boost of vapours into the surrounding atmosphere.

Such a vapour-emitter has now been found by the Applicants and forms the basis of the present invention.

According to the present invention a vapour-emitter capable of continuously and slowly emitting vapours, and repeatedly and rapidly expelling a boost of vapours, into the surrounding atmosphere, comprising a container having at least one slow release generator mounted therein, is characterized in that the container is provided with at least one opening at two different locations, the slow release generator being part of or forming a substantially vapour-tight partition between the locations and being in contact with the atmosphere on both sides of the partition, and expelling means being provided for expelling vapour-containing air from the container.

In use the orientation of the vapour-emitter will be such that the vapour-tight partition will be in a substantially horizontal position. Thus the slow release generator will emit vapours upwardly and downwardly which will either diffuse into the atmosphere surrounding the container or form a reservoir of stored vapour-containing air within the container as a result of the weight difference between the emitted vapours and air. The vapour-containing air may be expelled from the reservoir into the atmosphere, when desired, by activation of the expelling means.

The container may be of any convenient shape but is preferably in the form of a hollow cylinder having a substantially oval, polygonal or circular cross-section with the last-mentioned being particularly preferred.

The slow release generator may be rigidly or moveably mounted within the container. In a preferred embodiment of the present invention it is the moveably mounted slow release generator which rapidly expels the vapour-containing air from the container by reducing the volume of the reservoir of stored vapour-containing air. Other expelling means, e.g. air pressure, may be used in the case of an immovably mounted generator. The generator suitably has a cross-section corresponding to that of the container and in the case of a movably mounted generator it should have a maximum diameter just less than that of the inner diameter of the container. In preferred embodiments of the present invention the generator is a reciprocally mounted piston or a slidably or rotatably mounted solid or hollow sphere which also act as the expelling means.

In the case of a slidably or rotatably mounted spherical generator, positioned in a hollow cylindrical container, supports e.g. flanges are suitably provided on the upper and lower inner surface of the container upon which the spherical generator is capable of being supported or nestled and thereby may partly protrude outwardly from the container into the surrounding atmosphere. The supports or flanges also prevent the generator from falling out of the container when the container is in either of its vertical positions. The supports or flanges together with a nestled generator effectively close that end of the container. A nestled generator thereby forms a reservoir in the upper part of the container and can continuously and slowly emit vapours simultaneously outwardly into the surrounding atmosphere and inwardly into the reservoir to form a reservoir of stored vapour-containing air.

In the case of a reciprocally mounted piston generator the piston itself effectively closes one end of the container and thus also forms a reservoir in the remaining part of the container. Support means may be provided for preventing the piston from moving out of the container.

In both cases it is desirable that the length and diameter of the holder are such that the loss of stored vapour-containing air from the reservoir, by slowly diffusing through the end of the container into the surrounding atmosphere, is practically negligable.

According to one preferred embodiment of the present invention a vapour-emitter capable of continuously and slowly emitting vapours, and repeatedly and rapidly expelling a boost of vapours, into the atmosphere surrounding the container, comprises (a) a hollow cylindrical container, (b) a piston reciprocally mounted within the holder, the whole or part of each exposed surface of the piston being a slow release generator.

Thus when the above embodiment is being used as a vapour-emitter the piston is located at one end of the container. Both of the exposed surfaces thereof may have located thereon a slow release generator or the piston head itself may be a slow release generator. The slow release generator slowly emits vapours outwardly into the atmosphere surrounding the cylinder and inwardly into the container to form a reservoir of stored vapour-container air. When a boost of vapours is required the piston is moved along the container to expel at least part of the stored vapour-containing air from the reservoir into the surrounding atmosphere. The piston is suitably moved along the container by means of shafts attached to at least one of the exposed surfaces thereof. Stop means may be provided at both ends of the container to prevent the piston from being moved out of the container. The slow release generator, now positioned at the other end of the container, again continuously and slowly emits vapours outwardly into the surrounding atmosphere and inwardly into the container to form a further reservoir of stored vapour-containing air.

According to another preferred embodiment of the present invention a vapour-emitter capable of continuously and slowly emitting vapours, and repeatedly and rapidly expelling a boost of vapours, into the surrounding atmosphere, comprises (a) a hollow cylindrical container, having a substantially circular cross-section, (b) a spherical slow release generator slidably or rotatably mounted within the container, and (c) support means located at the upper and lower ends of the inner surface of the container, upon which the spherical generator is supported when the container is in either of its vertical position.

Thus when the above embodiment is being used as a vapour-emitter, the container is located in one vertical position and the supported generator slowly emits vapours outwardly into the atmosphere and inwardly into the container to form a reservoir of stored vapour-containing air. When a boost of vapours is required the container is simply turned over to its other vertical position and the spherical generator slides or rolls down the container to expel rapidly at least part of the stored vapour-containing air from the reservoir into the surrounding atmosphere. The generator is prevented from falling out of the container by the support located at the other end of inner surface of the holder. The thus again supported generator continuously and slowly emits vapours outwardly into the surrounding atmosphere and inwardly into the cylinder to form another reservoir of stored vapour-containing air. Suitably the support means are in the form of flanges although other support means, such as the ends of the container having a smaller diameter than the generator, may be used.

The vapour-emitter of the present invention may be provided with closing means e.g. caps so that the container may be completely closed when not in use.

As stated above slow release generators comprise carriers having incorporated therein a volatile compound.

Suitable carriers are solid materials and include inorganic materials such as silica-compounds, thermoplastic materials, thermosetting materials and rubbers etc. as well as mixtures thereof. Suitable thermoplastic carrier materials are, for example, polyethylene, polypropylene, copolymers of ethylene and propylene, polymethacrylate, cellophane, polyamides, polyesters, polyacrylates, polystyrene, polyvinyl chloride, polyvinylidene chloride, polyvinylacetate, copolymers of vinyl chloride and vinyl acetate, polyurethanes or polyaldehydes. Particularly suitable carriers are block copolymers of the polystyrene-polybudiene-polystyrene type.

Suitable volatile compounds include pesticides and odourants. Examples of pesticides include the volatile organic phosphorous containing compounds. Suitable odorants, which may be a substance that emits a pleasant odour (a perfume) or a substance which destroys or masks obnoxious odours (a deodorant) include the perfumes known as HX4530 or Everfresh (ex IFF, Holland). Suitable slow release generators comprise 5 to 35%w, preferably 15 to 25%w, of the volatile compound.

In addition to the volatile compounds, the slow release generator may have incorporated therein fillers, oils, dyes, anti-oxidants, stabilizers or plasticizers.

Figure 2:
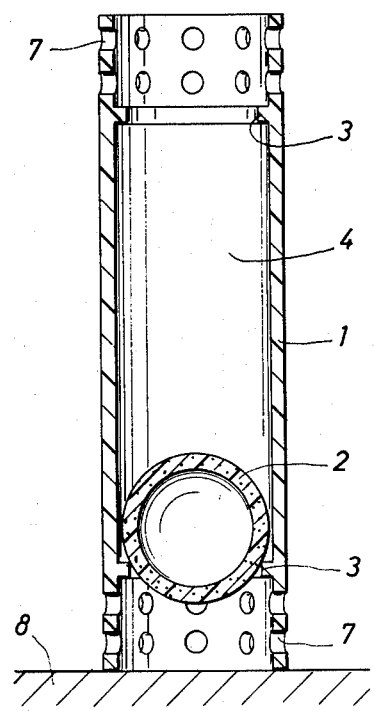
Figure 3:
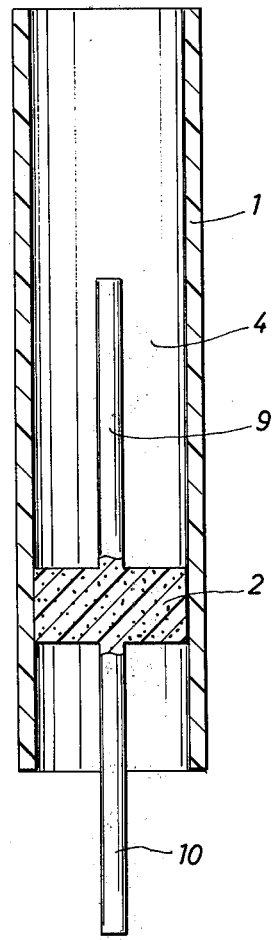

The invention will now be illustrated with reference to the following figures in which FIG. 1 is a vertical cross-section of one preferred embodiment of the present invention, FIG. 2 is a vertical cross-section of another preferred embodiment of the present invention, and FIG. 3 is a vertical cross-section of a further preferred embodiment of the present invention.

FIG. 1 shows a vapour-emitter comprising a container 1 in the form of hollow cylinder having flanges 3 upon which a hollow spherical slow release generator 2, having a wall of about 2 mm thickness, is nestled thereby closing the lower end of the container 1 and forming a reservoir 4 in the upper part thereof. The container 1 is rotatably mounted about the axis 5 on a wall 6. The hollow spherical generator comprises 80%w of a thermoplastic carrier and 20%w of a perfume (HX4530 ex IFF, Holland).

FIG. 2 is similar to FIG. 1 except that the container 1 is not rotatably mounted on a wall but is provided at the upper and lower ends thereof with perforations 7 which enables the container 1 to be supported on a support, e.g. on a shelf 8, without the spherical generator 2 being dislodged from its nestled position.

FIG. 3 shows a vapour-emitter comprising a container 1 in the form of a hollow cylinder having positioned at one end thereof the same slow release generator in the form of a reciprocally mounted piston head which closes the lower end of the container 1 and forms a reservoir 4 in the upper part thereof. Rods 9, 10 are provided on the exposed surface of the generator for moving the piston along the container 1. Instead of the generator being in the form of a piston head, a strip of generator may be provided on each of the exposed surfaces of a reciprocally mounted piston head.

The invention will now be illustrated by reference to the following example.

EXAMPLE

The vapour-emitter as illustrated in FIG. 1 is supported on a wall in a room. The spherical generator continuously and slowly emits perfume downwardly into the atmosphere of the room and simultaneously continuously and slowly emits perfume inwardly into the reservoir to produce a store of perfume-ladened air. The length and diameter of the container were such that the stored perfume does not diffuse, to any significant extent, through the upper end of the container into the atmosphere of the room. The container is then rotated and the spherical generator rolls or slides down the container thereby reducing the volume of the reservoir to expel rapidly a boost of stored perfume-containing air, from the lower end of the container, into the atmosphere of the room and thereby considerably increases the smell of perfume in the room. This rotation of the container was repeated when necessary.

We claim:

1. A vapour-emitter comprising a hollow container open at both ends, a slow release generator movably mounted within said container for movement between said ends and forming between said ends a substantially vapour-tight partition, support means at both ends of the container to retain the slow release generator in said container, said slow release generator when positioned at one end of the container forming with the support means a closure for that end and further forming with the container wall a reservoir of stored vapor-containing air, which air is emptied from the reservoir when the slow release generator is moved from one end of said container to the other.

2. The vapour-emitter of claim 1 wherein the container is a hollow cylinder.

3. The vapour-emitter of claim 2 wherein the slow release generator is a slidably or rotatably mounted solid or hollow sphere.

4. The vapour-emitter of claim 2 wherein the slow release generator is a reciprocally mounted piston.

5. The vapour-emitter of claim 3 wherein movement of the slow release generator is caused by turning the container from one vertical position to a second vertical position.

6. The vapour-emitter of claim 1 wherein the ends of the container are provided with closing means when not in use.

* * * * *